(12) United States Patent
Dai

(10) Patent No.: US 9,874,326 B1
(45) Date of Patent: Jan. 23, 2018

(54) SOLAR GARDEN LAMP

(71) Applicant: Ningbo Weitao Electrical Appliance Co., Ltd., Ningbo, Zhejiang (CN)

(72) Inventor: Jiangang Dai, Zhejiang (CN)

(73) Assignee: Ningbo Weitao Electrical Appliance Co., Ltd., Ningbo (CN)

( * ) Notice: Subject to any disclaimer, the term of this patent is extended or adjusted under 35 U.S.C. 154(b) by 0 days.

(21) Appl. No.: 15/336,818

(22) Filed: Oct. 28, 2016

(30) Foreign Application Priority Data

Aug. 30, 2016 (CN) ...................... 2016 2 1047281 U

(51) Int. Cl.
| | | |
|---|---|---|
| *F21S 9/03* | (2006.01) | |
| *F21V 7/04* | (2006.01) | |
| *F21V 1/00* | (2006.01) | |
| *F21V 5/04* | (2006.01) | |
| *F21Y 115/10* | (2016.01) | |
| *F21W 131/109* | (2006.01) | |

(52) U.S. Cl.
CPC ................ *F21S 9/035* (2013.01); *F21V 1/00* (2013.01); *F21V 5/04* (2013.01); *F21V 7/04* (2013.01); *F21W 2131/109* (2013.01); *F21Y 2115/10* (2016.08)

(58) Field of Classification Search
CPC .... F21S 9/035; F21V 1/00; F21V 5/04; F21V 7/04; F21Y 2115/10; F21W 2131/109
See application file for complete search history.

(56) References Cited

U.S. PATENT DOCUMENTS

| | | | | |
|---|---|---|---|---|
| 4,164,784 A | * | 8/1979 | Jaksich | F21S 6/002 362/282 |
| 4,310,875 A | * | 1/1982 | Price | F21S 8/00 362/269 |
| 4,977,488 A | * | 12/1990 | Spotts | F21S 9/037 136/291 |
| 5,217,296 A | * | 6/1993 | Tanner | F21S 8/00 136/291 |
| 5,424,931 A | * | 6/1995 | Wheeler | F21S 6/006 362/249.1 |
| D363,804 S | * | 10/1995 | Parker | D10/106.1 |
| 5,584,574 A | * | 12/1996 | Haddad | F21V 11/00 362/280 |
| D378,143 S | * | 2/1997 | Kollins | D26/60 |
| 8,348,453 B2 | * | 1/2013 | Cumberland | F21S 8/036 362/192 |

(Continued)

*Primary Examiner* — Mary Ellen Bowman

(57) ABSTRACT

A solar garden lamp includes a solar panel, a lamp body, and a bracket, the solar panel is installed on the bracket via a horizontally disposed solar panel support which is connected with the bracket via an erectly first rotating shaft with an electrical motor, the solar panel is rotatable around a front side of the solar panel support, the lamp body is connected with two sides of a fixing element via a horizontally disposed third rotating shaft, the fixing element is installed below the bracket and is connected with the bracket via an erect second rotating shaft, and the lamp body is capable of rotating around a perpendicular line where the third rotating shaft is connected. The solar panel can realize adjustment in two dimensions to meet absorption of solar light. The lamp body can realize the adjustment of each illuminating angle, and realize maximum illumination area.

8 Claims, 2 Drawing Sheets

(56) References Cited

U.S. PATENT DOCUMENTS

| | | | |
|---|---|---|---|
| 2007/0084500 A1* | 4/2007 | Chen | F16M 11/14 136/244 |
| 2008/0298051 A1* | 12/2008 | Chu | F21S 8/086 362/183 |
| 2010/0302764 A1* | 12/2010 | Yu | F21S 8/085 362/183 |

* cited by examiner

SOLAR GARDEN LAMP

CROSS-REFERENCE TO RELATED APPLICATIONS

The present application claims priority to Chinese Utility Model Application No. 201621047281.7 filed on Aug. 30, 2016, the contents of which are hereby incorporated by reference.

BACKGROUND OF THE INVENTION

Field of the Invention

The invention relates to lighting science and technology field and, more particularly to a solar garden lamp.

Description of the Related Art

With development of social economy, development of a city is more and more quick. In order to facilitate people's lives, lighting devices are provided at areas and parks of a city. A garden lamp is the main lighting equipment, and is widely used in various areas and park avenues of many people. The garden lamp is lighted for people at night, and is loved by people. However, the present garden lamp has a single function, and can only provide the lighting function, failing to satisfy the development requirements of the city.

The current market provides a solar garden lamp, which mainly uses solar panels to convert solar energy into electrical energy stored in a charging power supply, and then outputs power to a lamp head by the charging power supply, to achieve illumination. Usually, this garden lamp mainly uses a layer of circuit board structure, that is, a control chip, a light source, and a peripheral circuit are welded in a layer of circuit board, to realize the illumination by turning on the light source via the control chip. However, since the garden lamp placed in the area and the park cannot be regulated, and cannot receive the solar light at the maximum range, utilization of the solar energy is lower. Further, since the garden lamp is installed at a fixed place, the illuminating angle and illuminating area is limited.

BRIEF SUMMARY OF THE INVENTION

This invention provides a solar garden lamp, to realize multi-angle adjustment of a solar panel and multi-angle adjustment of an illuminating angle.

To solve the above technical problem, this invention provides a solar garden lamp including a solar panel, a lamp body, and a bracket, the solar panel is installed on the bracket via a horizontally disposed solar panel support, the solar panel support is connected with the bracket via an erectly first rotating shaft with an electrical motor, the solar panel is rotatable around a front side of the solar panel support, the lamp body is connected with two sides of a fixing element via a horizontally disposed third rotating shaft, the fixing element is installed below the bracket, the fixing element is connected with the bracket via an erect second rotating shaft, and the lamp body is capable of rotating around a perpendicular line where the third rotating shaft is connected.

Preferably, a transversely placed columnar structure may be at a front side of the solar panel, the solar panel may be connected with the solar panel support via a connecting element sleeved on the columnar structure, a plurality of clasps may be disposed at the bracket, a fastener may be disposed at a back surface of the solar panel, one end of the fastener may be movably connected with the back surface of the solar panel, and the other end of the fastener may be connected with the clasp, to adjust an inclination of the solar panel. As the columnar structure is disposed, the solar panel can rotate around the columnar structure, and the inclination can be adjusted. A plurality of clasps can be disposed to cooperate with the fastener for supporting the solar panel.

Preferably, a PCB control circuit board may be disposed in the bracket, the first rotating shaft may be a steering gear structure and may be connected with a motor, a locating fastener may be disposed on the first rotating shaft, and the rotating motor may be connected with the PCB control circuit board. Since the motor connected with the PCB control circuit board is disposed, the PCB control circuit board can determine whether the position of the solar panel is appropriate according to the solar energy received by the solar panel. If the position is not suitable, the motor is driven, and the motor drives the solar panel to rotate around the shaft for adjusting the position.

Preferably, a hanging plate for installation may be disposed at a backside of the bracket. Via the hanging plate, the solar garden lamp in the invention can be hanged on a wall.

Preferably, one end of the third rotating shaft may be a cylindrical structure and may be movably installed at two sides of the fixing element, the other end of the third rotating shaft may be a horizontally disposed hemispherical structure, a tail of the lamp body may be a hemispherical structure adapted to the other end of the third rotating shaft, and the tail of the lamp body may be movably connected with the other end of the third rotating shaft, to form sphericity. As the third rotating shaft and the fixing element are disposed, the lamp body can rotate around the other end of the third rotating shaft on a horizontal plane, while the third rotating shaft can further drive the lamp body to rotate on an erect plane. The fixing element can rotate around the second rotating shaft.

Preferably, the fixing element may have a groove at a front side, an induction assembly may be installed in the groove, and two sides of the induction assembly may be movably connected with sidewalls of the groove. Thus, via the induction assembly, the induction assembly can be rotate up and down in a certain range to adjust the induction range. Thus, the invention can be widely used in the practical application.

Preferably, the induction assembly may include an induction shell, the induction shell may have an opening at a front side, the opening may be covered by a lens shade, an induction PCB board may be installed in the induction shell, and an adjusting knob connected with the induction PCB board may be disposed at the induction shell. The adjusting knob can adjust the sensitivity of the induction assembly.

Preferably, the lamp body may include a lampshade with an opening at a front side, and a COB assembly installed in the lampshade. A reflecting bowl may sleeve the COB assembly, and a lamp head with a lens may cover the front side of the lampshade. A COB light source is used, that is, high efficiency integrated surface light source technology of allowing an LED chip to be directly attached to a metal substrate surface with a high reflection rate. This technology eliminates the concept of the bracket, without plating, reflow soldering, and patch process, so that the process is reduced by nearly $1/3$, and the cost saves $1/3$.

Compared with the prior art, in the invention, the solar panel support is provided with a rotatable connection between the solar panel support and the bracket. The solar panel is rotatable around and connected with the solar panel support. The solar panel can realize the adjustment in two dimensions to meet the absorption of solar light. The third rotating shaft and the fixing element are arranged, so that the lamp body can rotate on the horizontal plane around the other end of the third rotating shaft, and the third rotating shaft can drive the lamp body to rotate on the vertical face. The fixed element itself can rotate around the second rotating shaft. The lamp body can realize the adjustment of each illuminating angle, and realize the maximum illumination area.

DETAILED DESCRIPTION OF THE INVENTION

This invention is further described in detail with regard to the accompanying drawings.

In order to make the purpose of the invention, technical scheme and the advantages clear, according to the drawings and the embodiment of the invention, the specific embodiments described herein will be interpreted only in the interpretation of the invention, which are not intended to be used to limit the invention.

Figure 1:
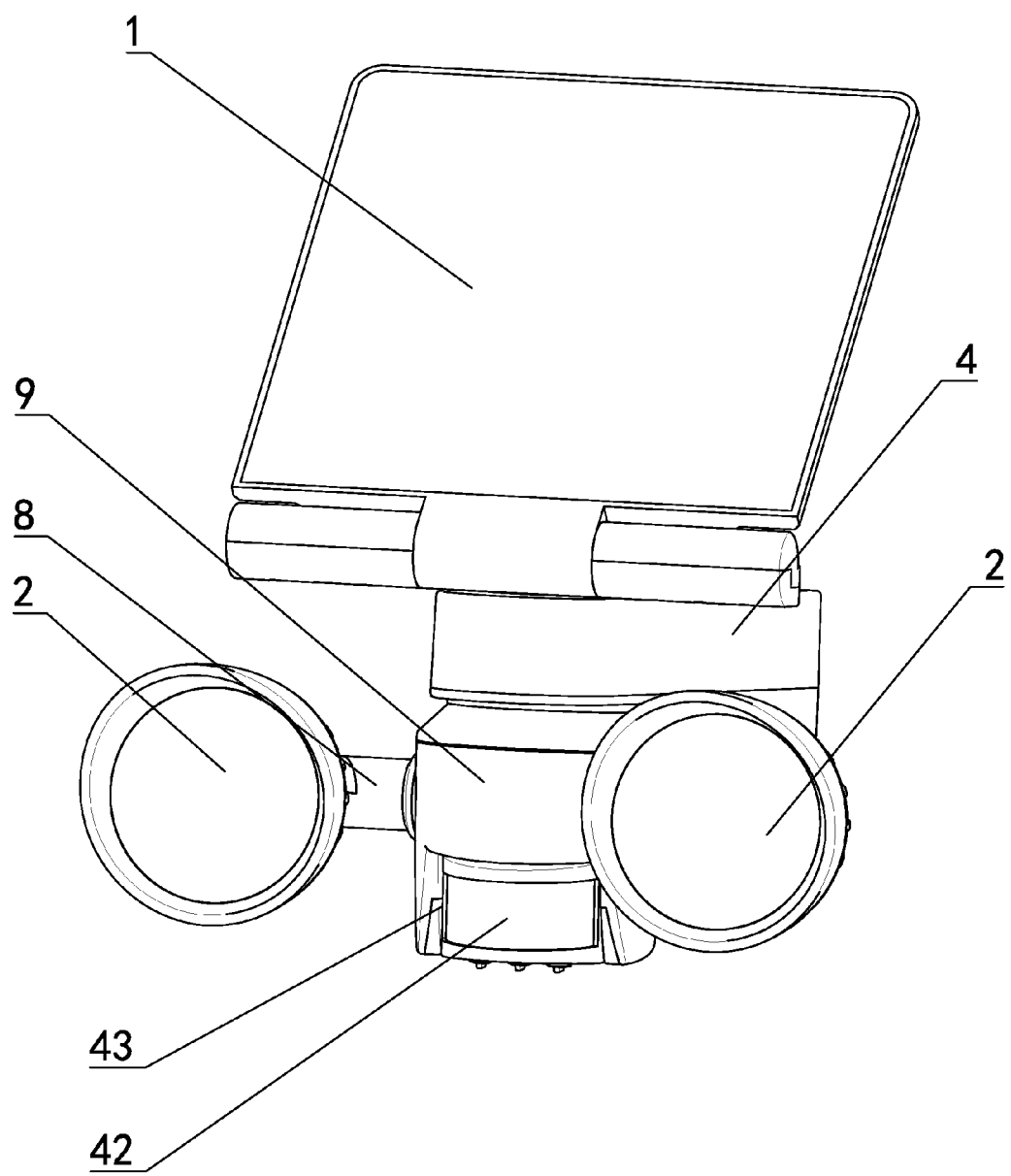
FIG. 1 is a structure schematic diagram of this invention.
Figure 2:
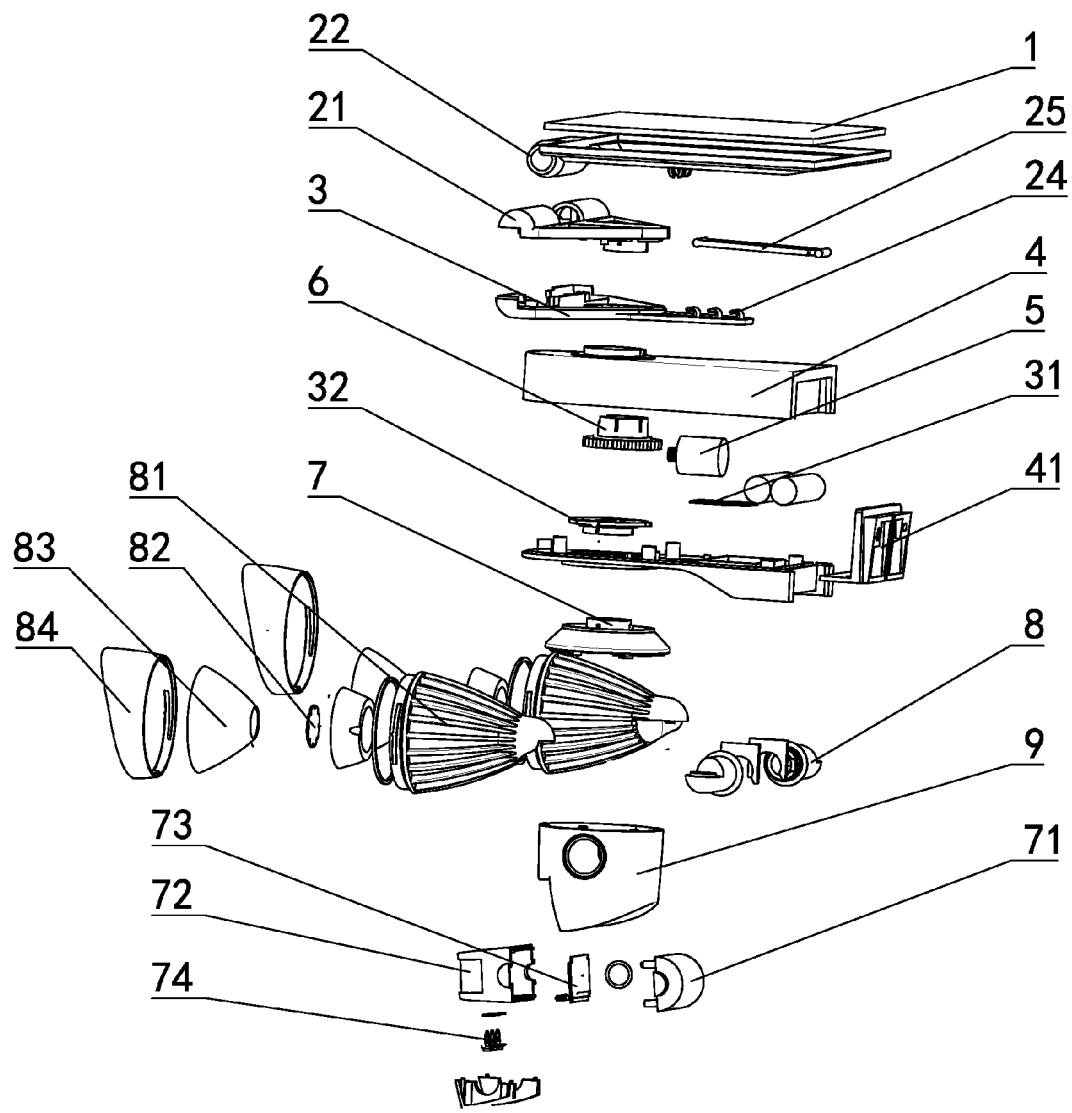
FIG. 2 is an exploded diagram of this invention.

In FIG. 1 and FIG. 2, a solar garden lamp includes a solar panel 1, a lamp body 2, and a bracket 4, the solar panel 1 is installed on the bracket 4 via a horizontally disposed solar panel support 3, the solar panel support 3 is connected with the bracket 4 via an erectly first rotating shaft 6 with an electrical motor 5, the solar panel 1 is rotatable around a front side of the solar panel support 3, the lamp body 2 is connected with two sides of a fixing element 9 via a horizontally disposed third rotating shaft 8, the fixing element 9 is installed below the bracket 4, the fixing element 9 is connected with the bracket 4 via an erect second rotating shaft 7, the lamp body 2 is capable of rotating around a perpendicular line where the third rotating shaft 8 is connected.

A transversely placed columnar structure 21 is at a front side of the solar panel 1, the solar panel 1 is connected with the solar panel support 3 via a connecting element 22 sleeved on the columnar structure 21, a plurality of clasps 24 are disposed at the bracket 4, a fastener 25 is disposed at a back surface of the solar panel 1, one end of the fastener 25 is movably connected with the back surface of the solar panel 1, and the other end of the fastener 25 is connected with the clasp 24, to adjust an inclination of the solar panel 1.

A PCB control circuit board 31 is disposed in the bracket 4, the first rotating shaft 6 is a steering gear structure and is connected with the electrical motor 5, a locating fastener 32 is disposed on the first rotating shaft 6, and the rotating electrical motor 5 is connected with the PCB control circuit board 31.

A hanging plate 41 for installation is disposed at a backside of the bracket 4.

One end of the third rotating shaft 8 is a cylindrical structure and is movably installed at two sides of the fixing element 9, the other end of the third rotating shaft 8 is a horizontally disposed hemispherical structure, a tail of the lamp body 2 is a hemispherical structure adapted to the other end of the third rotating shaft 8, and the tail of the lamp body 2 is movably connected with the other end of the third rotating shaft 8, to form sphericity.

The fixing element 9 has a groove 43 at a front side, an induction assembly 42 is installed in the groove 43, and two sides of the induction assembly 42 are movably connected with sidewalls of the groove 43.

The induction assembly 42 includes an induction shell 71, the induction shell 71 has an opening at a front side, the opening is covered by a lens shade 72, an induction PCB board 73 is installed in the induction shell 71, and an adjusting knob 74 connected with the induction PCB board 73 is disposed at the induction shell 71.

The lamp body 2 includes a lampshade 81 with an opening at a front side, and a COB assembly 82 installed in the lampshade 81, the COB assembly 82 is sleeved by a reflecting bowl 83, and the front side of the lampshade 81 is covered by a lamp head 84 with a lens.

The above is only a preferred embodiment of the present invention, and does not limit the invention. Any modification, equivalent replacement and improvement made within the spirit and principles of the invention should be included in the scope of the invention.

What is claimed is:

1. A solar garden lamp comprising a solar panel, a lamp body, and a bracket, wherein the solar panel is installed on the bracket via a horizontally disposed solar panel support, the solar panel support is connected with the bracket via an erectly first rotating shaft with an electrical motor, the solar panel is rotatable around a front side of the solar panel support, the lamp body is connected with two sides of a fixing element via a horizontally disposed third rotating shaft, the fixing element is installed below the bracket, the fixing element is connected with the bracket via an erect second rotating shaft, and the lamp body is capable of rotating around a perpendicular line where the third rotating shaft is connected.

2. The solar garden lamp according to claim 1, wherein a transversely placed columnar structure is at a front side of the solar panel, the solar panel is connected with the solar panel support via a connecting element sleeved on the columnar structure, a plurality of clasps are disposed at the bracket, a fastener is disposed at a back surface of the solar panel, one end of the fastener is movably connected with the back surface of the solar panel, and the other end of the fastener is connected with the clasp, to adjust an inclination of the solar panel.

3. The solar garden lamp according to claim 1, wherein a PCB control circuit board is disposed in the bracket, the first rotating shaft is a steering gear structure and is connected with the electrical motor, a locating fastener is disposed on the first rotating shaft, and the rotating motor is connected with the PCB control circuit board.

4. The solar garden lamp according to claim 1, wherein a hanging plate for installation is disposed at a backside of the bracket.

5. The solar garden lamp according to claim 1, wherein one end of the third rotating shaft is a cylindrical structure and is movably installed at two sides of the fixing element, the other end of the third rotating shaft is a horizontally disposed hemispherical structure, a tail of the lamp body is a hemispherical structure adapted to the other end of the third rotating shaft, and the tail of the lamp body is movably connected with the other end of the third rotating shaft, to form sphericity.

6. The solar garden lamp according to claim 1, wherein the fixing element has a groove at a front side, an induction assembly is installed in the groove, and two sides of the induction assembly are movably connected with sidewalls of the groove.

7. The solar garden lamp according to claim 6, wherein the induction assembly comprises an induction shell, the induction shell has an opening at a front side, the opening is covered by a lens shade, an induction PCB board is installed in the induction shell, and an adjusting knob connected with the induction PCB board is disposed at the induction shell.

8. The solar garden lamp according to claim 1, wherein the lamp body comprises a lampshade with an opening at a front side, and a COB assembly installed in the lampshade, the COB assembly is sleeved by a reflecting bowl, and the front side of the lampshade is covered by a lamp head with a lens.

\* \* \* \* \*